United States Patent [19]

Wisniewski

[11] Patent Number: 4,511,829

[45] Date of Patent: Apr. 16, 1985

[54] DIRECT CURRENT CONTROL IN INDUCTIVE LOADS

[75] Inventor: Waldemar S. Wisniewski, Orangevale, Calif.

[73] Assignee: Exploration Logging, Inc., Sacramento, Calif.

[21] Appl. No.: 436,043

[22] Filed: Oct. 22, 1982

Related U.S. Application Data

[63] Continuation of Ser. No. 169,764, Jul. 17, 1980, abandoned.

[51] Int. Cl.³ .................. G05B 5/00; H02K 27/20; H01H 47/32
[52] U.S. Cl. .................. 318/317; 318/331; 318/345 AB; 361/154
[58] Field of Search .......... 361/152, 153, 154, 93; 323/282, 284, 287; 307/106, 253, 296 A; 318/139, 310, 317, 327, 330, 331, 345 AB, 345 CA

[56] References Cited

U.S. PATENT DOCUMENTS

| | | | |
|---|---|---|---|
| 3,403,320 | 9/1968 | Whitman | 361/93 X |
| 3,506,910 | 4/1970 | Bevis | 323/287 |
| 3,508,134 | 4/1970 | Dosch et al. | 318/345 CA |
| 3,629,633 | 12/1971 | O'Callaghan | 318/317 X |
| 3,855,511 | 12/1974 | Smith | 318/317 |
| 3,895,278 | 7/1975 | Picunke | 318/327 X |
| 3,927,357 | 12/1975 | Konrad | 318/139 |
| 3,980,934 | 9/1976 | Wright | 318/139 |
| 4,074,175 | 2/1978 | Born et al. | 318/317 X |
| 4,084,119 | 4/1978 | Kato et al. | 318/139 X |
| 4,295,177 | 10/1981 | Woodhouse et al. | 361/154 |
| 4,300,508 | 11/1981 | Streit et al. | 361/154 X |
| 4,336,564 | 6/1982 | Wisniewski et al. | 361/154 |

OTHER PUBLICATIONS

J. D. Ryder, "Electronic Fundamentals and Applications," Prentice-Hall, Inc., 1964, pp. 127-136.
I. Gottlieb, "Switching Regulators and Power Supplies", Tab Books Inc., 1976, pp. 25-28.

Primary Examiner—Ulysses Weldon
Attorney, Agent, or Firm—Christie, Parker & Hale

[57] ABSTRACT

A DC current control is provided for inductive loads which achieves high energy efficiency even though the supply voltage may be subject to considerable variations.

The inductive load may be a DC motor, a solenoid, or similar device. The electric power is applied directly to the inductive load through a switching means which closes the circuit to apply a charging current to the inductive load for fixed on periods of time.

A discharge path is provided for the inductive load when the switching means opens the charging circuit. The discharge current is monitored, and when it decays to a selected value, the switching means is again closed for the fixed on charge time.

12 Claims, 13 Drawing Figures

(A) THEORETICAL

Fig. 1A

Fig. 1B (B) PRACTICAL

78340 SWITCHING CONTROL MODULE

Fig. 5

TYPICAL BASIC CIRCUIT USING THE 78S40 REGULATOR

Fig. 6

PROTOTYPE CIRCUIT

Fig. 7

SOLENOID CURRENT DRIVER

DIRECT CURRENT CONTROL IN INDUCTIVE LOADS

This application is a continuation of application Ser. No. 169,764 which was filed on July 17, 1980 now abandoned.

BACKGROUND OF THE INVENTION

1. Field of the Invention

This invention relates to methods and apparatus for controlling the current in an inductive device from a source of direct current electric power with high energy efficiency, even though the supply voltage from the source may be subject to considerable variations.

An application of the direct current control to operate a solenoid employed in well logging apparatus is disclosed in application Ser. No. 169,763 filed on July 17, 1980, now U.S. Pat. No. 4,336,564 issued on June 22, 1982.

2. The Prior Art

The presently existing techniques for controlling the DC current in an inductive device may be placed in three major classes as follows:

(a) Varying the Effective Voltage at the Load

The technique makes use of the relationship that the current, through a fixed resistance, is directly proportional to the voltage applied. The voltage applied to the load is monitored and the power source is directly or indirectly adjusted to maintain the required voltage. Direct control of the power source (e.g. adjusting the current in the field winding of a generator) is most often impractical or impossible. Indirect control is accomplished by placing some form of electronic voltage regulator between the power source and the load. A series type regulator allows for rapid and precise control of the applied voltage but often dissipates 60%–90% of the supplied power. A switching type regulator normally dissipates less than 20% of the supplied power but suffers from slow response to step changes in output voltage requirements. The power inductors and the filter capacitors are often exotic and bulky for high current applications, although this is offset by the reduced needs of heat sinks.

A limitation of using voltage control to set the current in the load is if the load resistance changes (within one unit or from unit to unit), the current will change in inverse proportion since the feedback circuits that are usually employed have no means of detecting this change of resistance.

(b) Passively Limiting the Current Through the Load

This technique makes use of the relationship that current is inversely proportional to resistance with a constant applied voltage. Although the least energy efficient of the three techniques, this approach is most commonly used due to its simplicity. A resistor is installed between the load and the power source. The value of the resistor is chosen such that the combined series resistance of the control resistor and the load limit the current to the desired value. If different values of currents are needed in one application, different resistor values are installed in the circuit via mechanical or electronic switches. This approach suffers several serious setbacks. Load resistance changes will change the load current, although not to the same extent as with voltage control. The resistor will dissipate as much or more power than a series regulator does (it is in fact a very simple series regulator). The most important limitation occurs when the supply voltage varies.

Since the resistance value of the load and control resistor combination remains constant, the supplied load current will vary proportionally with the supply voltage. This lack of regulation can be intolerable in most situations. This approach is also lacking in energy and volume efficiencies. The resistor value is designed to produce the desired current at the minimum supplied voltage. As the voltage increases, the supplied current increases proportionately. The power dissipation, however, increases according to the square of the current change (e.g., a doubling of the input voltage doubles the current, but the power dissipation increase by four times). The resistor, then must be of a power rating to withstand the stresses at the maximum voltage.

(c) Actively Limiting the Current Through the Load

In this technique, an active device (e.g., a transistor) is used to limit the current supplied to the load. A current sensing element (e.g., a resistor) is placed in series with the load and the voltage across this element is monitored. The control device is then set via electronics to adjust its effective resistance to limit the current to the desired amount. This system has merits in that the supplied current remains constant whether the load resistance changes or the input voltage varies. The power dissipation is similar to that of a series pass regulator. If the current range required is large, the sensing element may present a problem. A value that develops sufficient feedback voltage at low currents may be too large to allow the high end of the current range to be used at minimum supply voltage (too much resistance in the line).

SUMMARY OF THE INVENTION

Efficient direct current control in an inductive load is achieved in the present invention by applying the electric power directly to the inductive load element through a switching means which closes the circuit to apply a charging current to the inductive load for fixed on periods of time. A discharge path is provided for the inductive load when the switching means opens the charging circuit. In the preferred embodiment the discharge path comprises a freewheel diode and a resistor connected across the inductive load. The current in the discharge path is monitored, and when the discharge current has decayed to a selective value, the switching means is again closed for the fixed on charge time.

Since the electric power is applied directly to the load element with very little loss in the control circuitry, substantially all of the electric power is dissipated in the inductive load itself. The electromagnetic energy which is stored in the inductive load may be employed to actuate a mechanical device, such as a solenoid or motor.

DESCRIPTION OF THE PREFERRED EMBODIMENTS

Figure 1A:
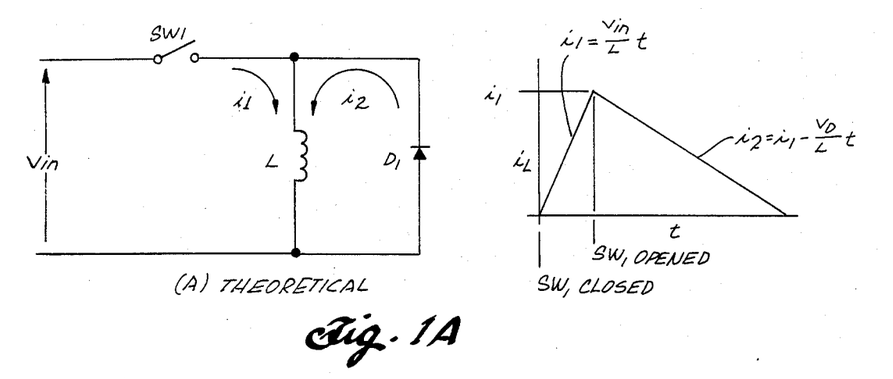
FIGS. 1A, 1B, and 1C illustrate the principles upon which the present invention are based.

FIG. 1(A) shows an inductor L placed in a series circuit with a switch SW1 and power source $V_{IN}$. The freewheel diode D1 or other unidirectional conductor for electric current is used to provide an alternate current path for the inductor when SW1 is opened. Assuming no initial currents, the following holds true when SW1 is closed:

$$V_L = L \frac{di}{dt} \tag{1}$$

$$i_L = \frac{1}{L} \int_0^t V_L \, dt \tag{2}$$

Due to the series circuit, when SW1 is closed $V_L = V_{IN}$ and is constant. Therefore, Equation (2) becomes:

$$i_L = \frac{V_L}{L} t \tag{3}$$

Figure 1B:
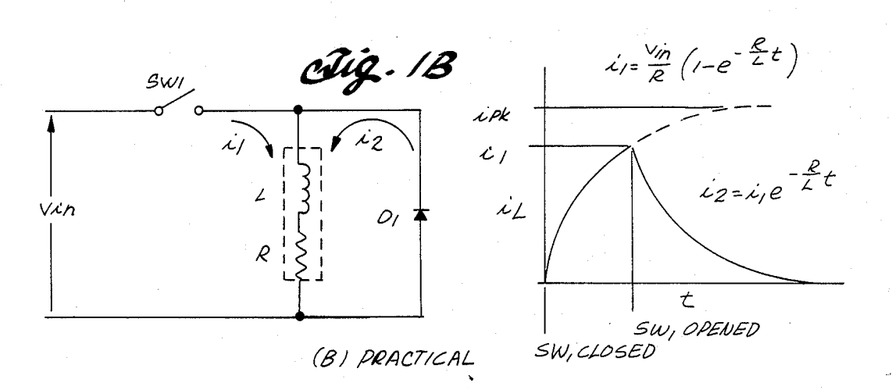

Complications set in when one realizes that real-life inductors exhibit a finite resistance $R_L$ as illustrated in FIG. 1(B). As current starts to flow, this resistance drops part of the voltage $V_{RL}$, leaving a lower value for the inductance. Eventually $V_{RL}$ will equal $V_{IN}$ and the current will remain at a constant value. Solving equation (2) for this condition yields the standard charge curve:

$$i_L = \frac{V_{IN}}{R_L} \left(1 - e^{-\frac{R_L}{L} t}\right) \tag{4}$$

If the time period that $i_L$ is examined is short in relation to the time constant $L/R_L$ equation (4) can be approximated:

$$i_L = I_o + \frac{V_{IN} - I_o R_L}{L} t \Big|_0^{t_2 - t_1} \tag{5}$$

where $I_o$, is the current at the start of the period $t_2 - t_1$ and t is a relative time from $t_1$ to $t_2$. The current now appears to be a series of linear ramps with slopes dependent upon the current present in the inductor.

When SW1 is opened, the inductance opposes any change in current and will develop a sourcing potential (back EMF or inductive kick) to maintain the current. Since the coil voltage changes polarity, D1 conducts. Assuming a perfect diode, the inductor voltage and current become:

$$V_L = I_o R_L e^{-\frac{R_L}{L} t} \tag{6}$$

$$i_L = I_o e^{-\frac{R_L}{L} t} \tag{7}$$

where $I_o$ is the current through the inductor at the time the switch is opened.

As with the charging current, if the change in discharge current examined is small in relation to the current value, the discharge current curve portion can be approximated:

$$i_L = I_1 - \frac{I_1 R_L}{L} t \Big|_0^{t_2 - t_1} \tag{8}$$

where $I_1$ is the current at the start of the period $t_2 - t_1$.

Figure 1C:
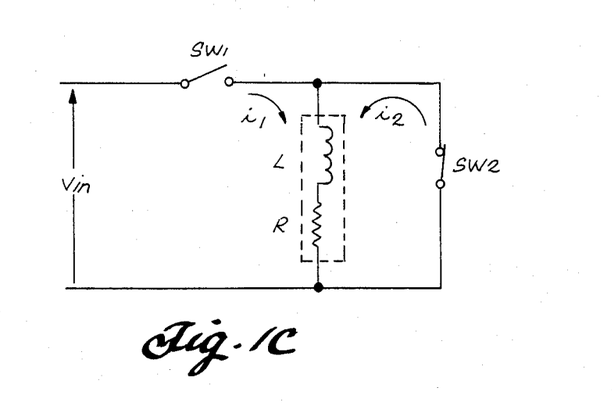

FIG. 1(C) shows how the invention can be practiced using a switch SW2 in the place of the diode D1. When SW1 is closed to provide the charging current SW2 is open, and when SW1 is open SW2 is closed to provide the discharge path.

The charging cycles $t_0$ to $t_1$ will be of less duration than the discharge cycles $t_1$ to $t_2$. In order to obtain more constant regulation, the charging cycle should be very short, e.g., 200 microseconds.

Figure 2:
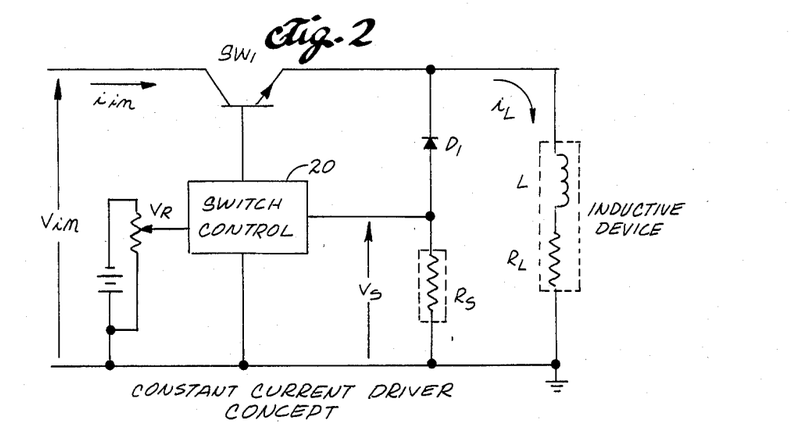
FIG. 2 is a diagram which illustrates the broad concept of the invention.
Figure 3A:
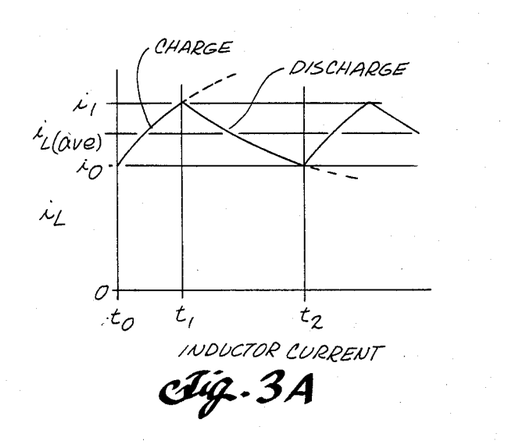
FIGS. 3A, 3B, 3C, and 3D show the idealized waveforms for the apparatus of FIG. 2.
Figure 3B:
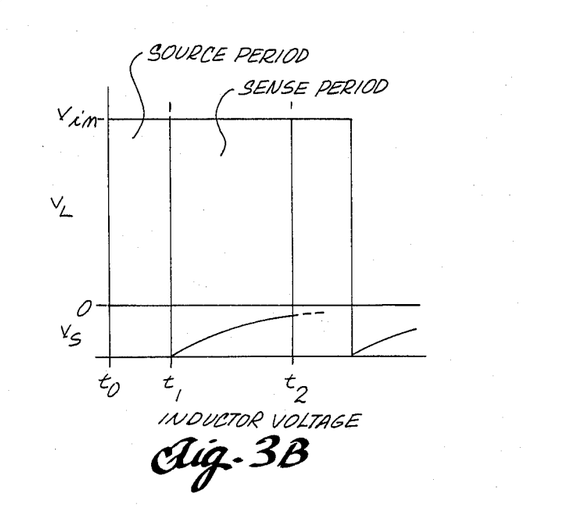
Figure 3C:
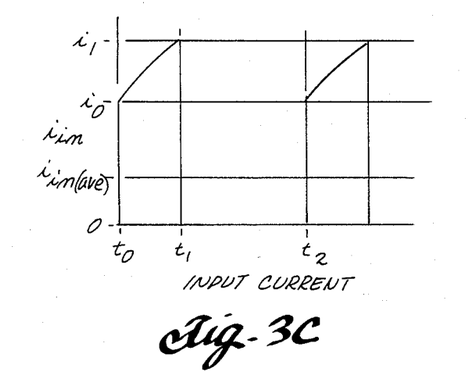
Figure 3D:
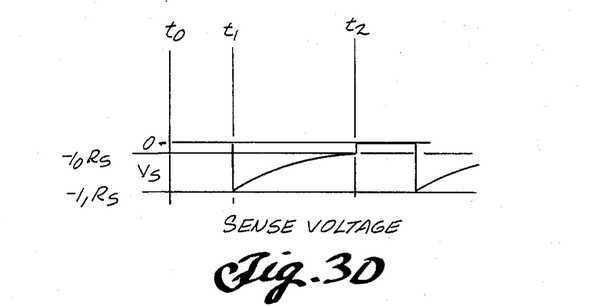

The present invention operates on the above-outlined principles as illustrated in broad concept in FIGS. 2 and 3.

The switch SW1 is turned on and off by a switch control circuit 20. A resistor $R_S$ is employed in the discharge current leg to provide a control voltage $V_S$ to the control circuit which compares $V_S$ to a preset reference voltage $V_R$ and actuates SW1 when $V_S$ is equal to $V_R$.

The switch SW1 is turned on for fixed periods of time $t_0$ to $t_1$. It is turned off for variable periods of time $t_1$ to $t_2$ which are determined by the time required for the IR drops across $R_S$ to equal $V_R$.

In operation, a known current $I_0$ is established and flows in the inductor L when SW1 is closed at time $t_0$. The switch is opened after a brief fixed time $T_1$. At this time the inductor current has reached a value $I_1$. The current in the inductor-diode loop is monitored, and when the current has decayed back to the value of $I_0$ at time $t_2$, the switch is closed again for the fixed charge time. This cycle is then repeated.

In order to avoid unwanted resistance during the charge time, decay current sensing is done in the diode leg of the circuit. If the time period $t_1 - t_0$ is kept short, the effective current in the inductor is $I_0$.

FIGS. 3A, 3B, and 3C, and 3D show idealized current waveforms for the inductor and the switch of FIG. 2. If the charge time $t_1 - t_0$ is short enough to keep the current change $I_1 - I_0$ small compared to $I_0$, the inductor current is essentially a fixed DC value. The average supply current effectively becomes:

$$I_{IN} = I_o \frac{t_1 - t_o}{t_2 - t_o} \tag{9}$$

or the inductor current times the duty cycle (ratio of on time to cycle time). The duty cycle can be approximated (ignoring sense resistor loss):

$$\frac{t_1 - t_o}{t_2 - t_o} = \frac{I_o R_L}{V_{IN}} \tag{10}$$

The system in FIG. 2 achieves the desired results in controlling DC currents in inductive loads. The current in the coil is maintained by means of charge and discharge cycles, the circuit losses are minimized because the control element operates in a switching mode, and current sensing does not interfere with the main current source path. The current from the source $V_{IN}$ is applied directly to the load inductor L during the charge cycle to provide power efficiently, and the current produced by the inductor during the discharge cycle is also employed for efficiency. The energy that is stored in the inductance provides an efficiency that is not produced by the prior art devices. $R_S$ has small resistance so that little power is lost in developing $V_S$. No capacitive element is used in developing $V_S$ because immediate response is needed, and all of the stored energy should be in the inductance.

The switch control circuit 20 may be a standard commercially available integrated circuit for switch regulation, such as the Fairchild 78S40, the Texas Instruments TI 497, or the 1524 or 3524 that are available from multiple sources. Such circuits may be connected to drive a transistor switch, sense the voltage drop across the current sense resistor $R_S$ and control the off time until the preset reference level $V_R$ is reached.

Figure 4:
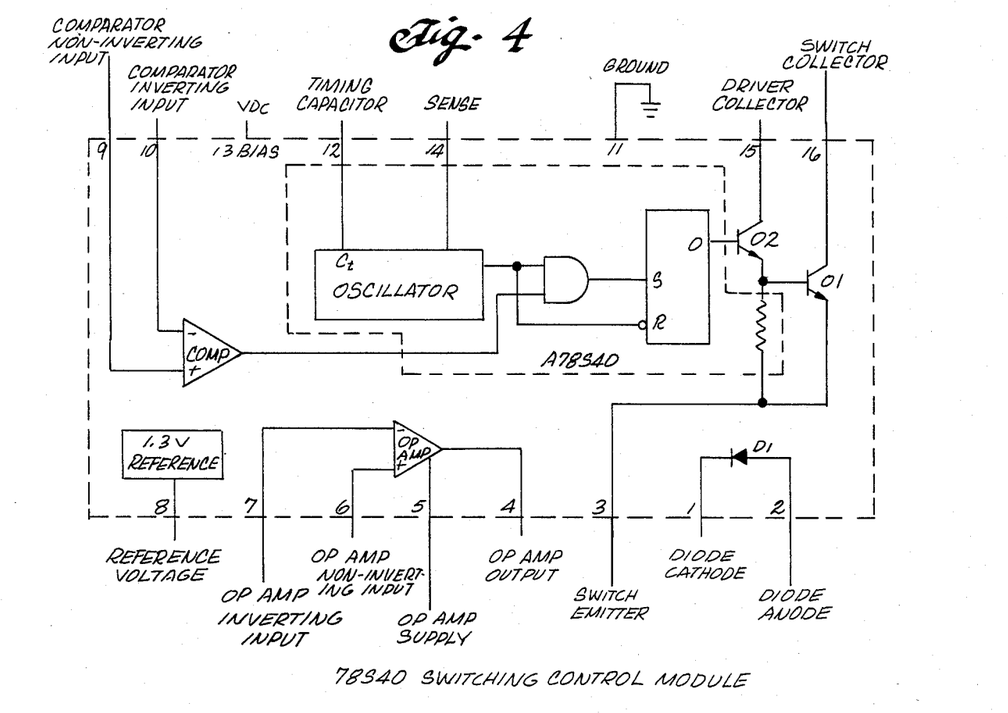
FIG. 4 shows the circuit of a type Fairchild 78S40 integrated circuit.

FIG. 4 shows the circuit of the Fairchild 78S40. It comprises a fixed on period switching regulator, a voltage reference source, and an uncommitted operational amplifier. The on time is controlled by the capacitance $C_t$.

Figure 5:
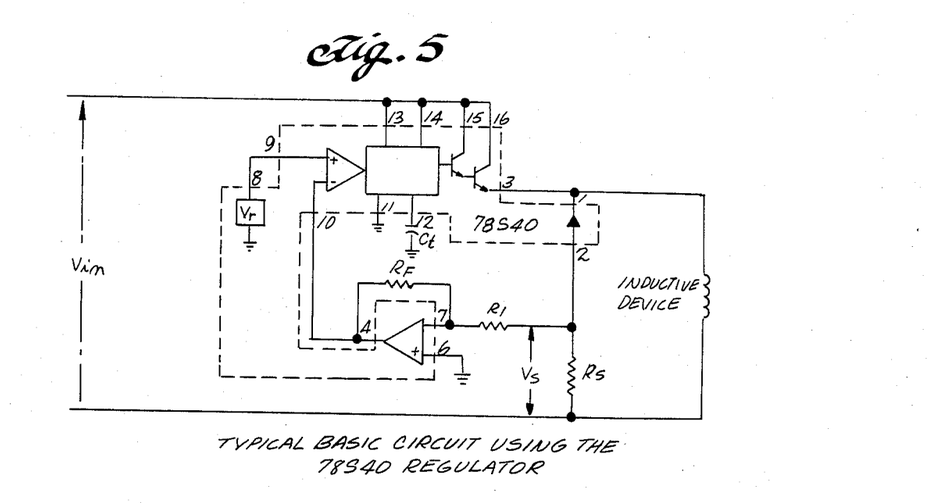
FIG. 5 shows how the circuit of FIG. 4 may be employed to provide the switching action.

FIG. 5 shows the regulator of FIG. 4 in a circuit for controlling the current in an inductive load. This circuit can be used only if the input voltage and load currents are within the operational limits of the regulator. In FIG. 5 the operational amplifier is used to correct the polarity of the current sense signal (from negative-going to positive-going) and adjust the effective value presented to the regulator comparator (at the setpoint current the voltage output of the amplifier will equal $V_R$). $C_t$ is chose to give an on-time consistent with the load time constant (L/R) and the response times of the switch, amplifier, and comparator. For a varied current output, $V_R$ would be varied.

Figure 6:
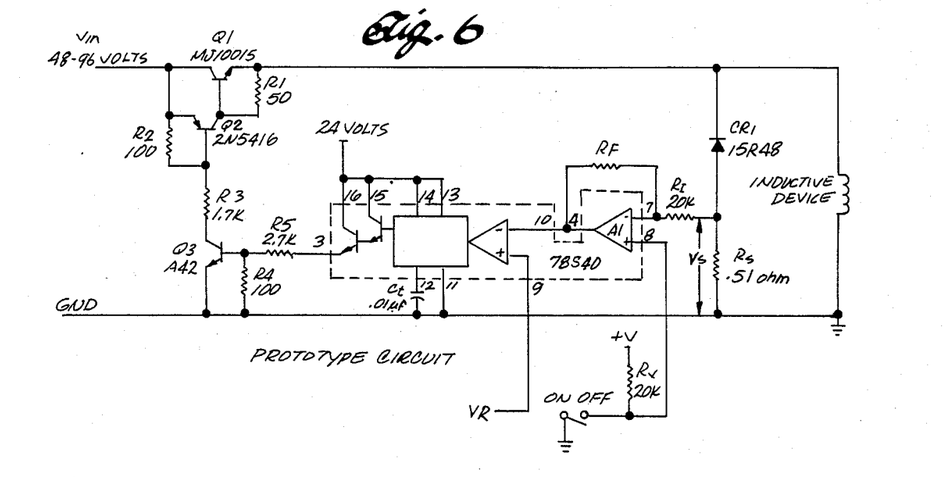
FIG. 6 shows how the circuit of FIG. 4 may be employed to provide the switching action for applying higher power to an inductive load.

FIG. 6 shows a similar current regulator for use with higher voltage and load current requirements. A separate switch circuit ($Q_1$, $Q_2$, $Q_3$) was used because the input voltage and load currents of this system exceeded the operational limits of the 78S40. Rx was added to allow for electronic system turn-off. When the ON/OFF line is open, +V forces the output of the sense amplifier A1 to always exceed $V_R$, thus keeping the regulator from turning on. When the ON/OFF line is shorted to ground, the circuit operates in the normal mode. $C_t$ was chosen at 0.01 μf to allow a 200 μsec on time, which is considerably smaller than the typical time constant of the chosen load (100 msec min.) but still slow enough to allow adequate operation of A1 and the switch system.

Several DC solenoids were used as loads. The circuit controlled the currents at the desired value regardless of the type of solenoid used or the nominal voltage rating of the solenoid used. $C_t$ was varied in order to determine the change of efficiency resulting. Better circuit efficiency was noticed as the on time was decreased until the operational speeds of the amplifier and switch were reached.

The principle requirements of a solenoid driver are a high-current drive to move the plunger and, once the plunger has completed its travel, reduce the current to a much lower value that is sufficient to hold the plunger in place. Current practice is to apply the entire source supply across the solenoid for the time needed to move the solenoid. When this time is passed (either a fixed time period or plunger motion sensed by some device), a load reduction device (typically a resistor) is switched into the circuit (e.g., U.S. Pat. No. 3,766,432).

Figure 7:
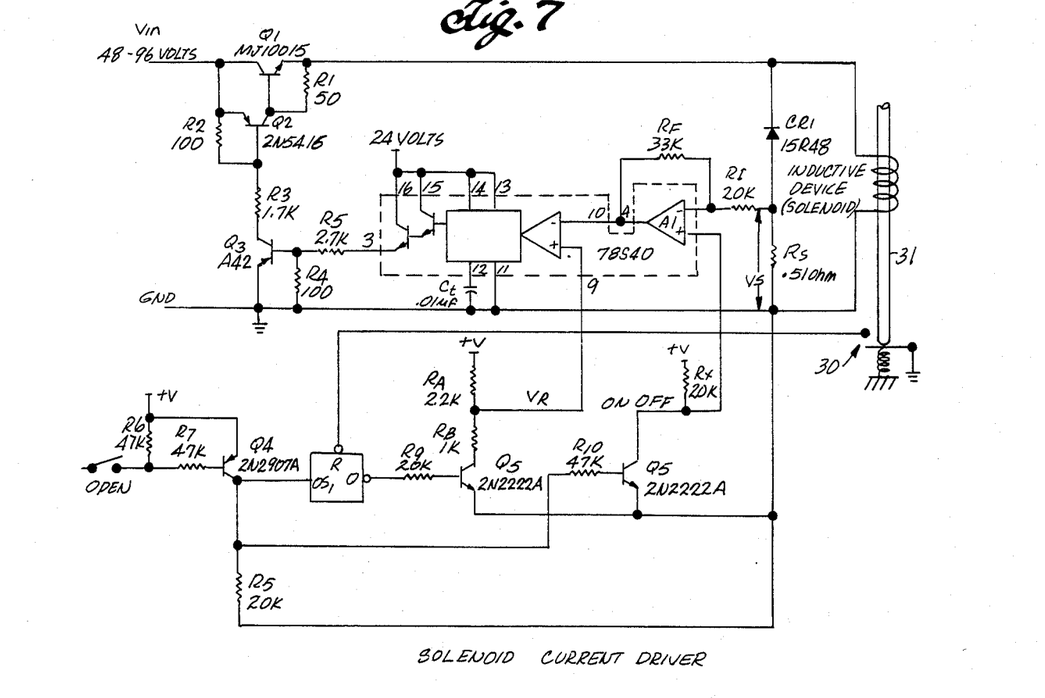
FIG. 7 shows how the circuit of FIG. 6 may be employed to provide the switching action for a solenoid.

FIG. 7 shows a solenoid driver using the current driver of FIG. 6. When the "OPEN" signal is applied to Q4, Q6 is turned on (allowing the regulator to operate). Also the one-shot multivibrator $OS_1$ is fired for a fixed period of time turning Q5 off during this time period. This applies the entire +V to $V_R$ of the regulator (via $R_A$) and the $R_F/R_I$ feedback ratio in the driver sets the value of the high pull-in current. The one-shot multivibrator is reset by an external plunger motion sensing system 30 having a switch which is closed when the solenoid is energized and moves its armature 31 upwardly. When the one-shot time is reset Q5 turns on. This action reduces $V_R$ by the resistance ratio of $R_B/(R_A+R_B)$. With a lower reference voltage to meet, the regulator reduces the output current by the same ratio so that $V_S$ is substantially equal to $V_R$, thus deriving the required holding current. When the "OPEN" signal is removed, Q6 is turned off preventing the regulator from supplying any current to the solenoid.

The circuit of FIG. 7 is particularly suitable for use in well logging during the drilling operation for the well, where the power for operating the solenoid is obtained from a turbine generator that is actuated by the flow of mud used in the drilling operation. In such applications the voltage $V_{IN}$ may vary from 48 to 96 volts so that good regulation is essential in order to obtain substantially constant current for actuating the solenoid. It is essential that overheating caused by the electric circuitry be avoided, and the efficiency of the apparatus of this invention satisfies that requirement.

Figure 8:
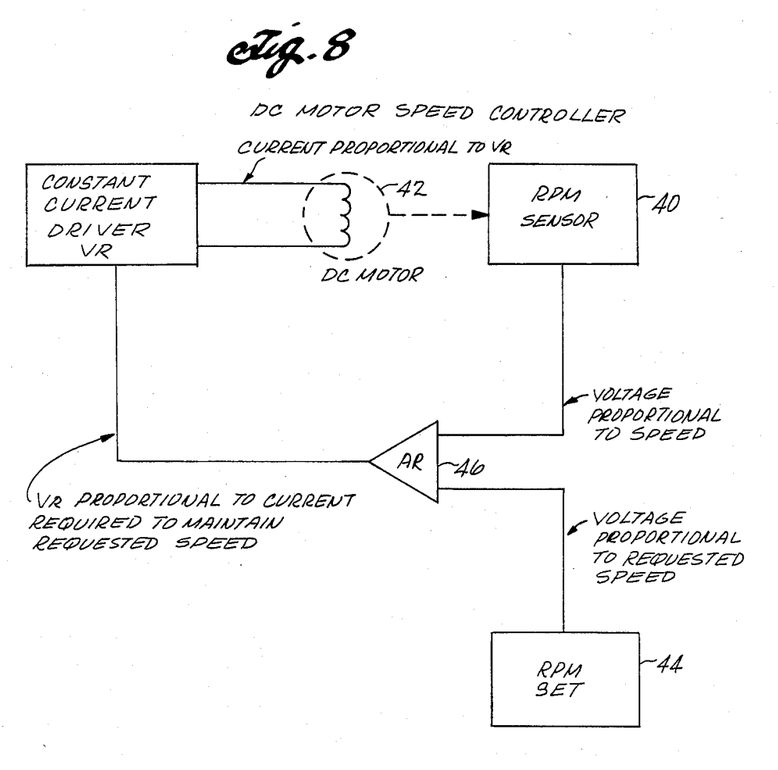
FIG. 8 illustrates how the invention may be employed to control a DC motor.

FIG. 8 illustrates the application of the current controller to operate a DC motor.

A RPM sensor 40 provides a voltage that is proportional to the speed of rotation of the DC motor 42. The sensor 40 may be a tachometer or an encoding disk. A RPM set 44 serves to provide a voltage representative of the desired speed of rotation, and that may be adjustable if desired.

The outputs of RPM sensor 40 and RPM set 44 are applied to a comprising amplifier 46 and the resultant control signal $V_R$ is applied to constant current driver of the general type discussed above with reference to FIGS. 6 or 7 which supplies a regulated current to the motor 42. Thus, $V_R$ and $V_S$ are compared and the switching means in the constant current driver is actuated each time that $V_R$ and $V_S$ have a certain or predetermined relationship.

In this circuit, not only are the efficiencies of the current regulator attained, but only the power needed to maintain the requested speed is applied to the motor, thereby providing a very efficient means of controlling a DC motor that is not achieved by the prior art.

The DC motor control arrangement is especially suitable for use in electric vehicles that are battery powered because the efficiency of the circuit serves to conserve the power of the batteries. With such an arrangement, the vehicle can travel farther between charges than vehicles using other existing circuit arrangements.

The preferred embodiments employ a freewheeling diode or other unidirectional conductor means to provide the discharge path for the inductive load. However, a switching means electronically controlled by the control circuits may be employed to provide the discharge path, as illustrated in FIG. 1(C).

What is claimed is:

1. A current regulator comprising:
   (a) a source of direct current power,
   (b) an inductor for supplying electromagnetic energy to a mechanical load;
   (c) switching means for supplying power from the source of direct current power to the inductor,
   (d) means for actuating said switching means to apply electric current from the source to the inductor for predetermined fixed periods of time during all charging cycles, so that the charging cycles are of fixed time duration irrespective of changes in the load or of changes in the voltage of the source of direct current power,
   (e) means for discharging electric current from the inductor during periods of time constituting discharging cycles intermediate the charging cycles, and
   (f) sensing means responsive to the electric current which is discharged from the inductor during each discharging cycle for actuating said switching means to apply electric current from the source to the inductor to initiate a charge cycle and to terminate each discharge cycle when the electric current which is discharged from the inductor during discharge cycles decays to a predetermined value to maintain the magnitude of the electric current in the inductor substantially constant with the value varying between the narrow limits of the value at the end of the discharging cycles and the value at the end of the charging cycles which is determined by the fixed period of time during which the charging cycles take place.

2. The current regulator of claim 1 wherein the means for discharging electric current from the inductor is a unidirectional conductive device.

3. The current regulator of claim 1 wherein the means for discharging electric current from the inductor is a freewheeling diode.

4. The current regulator of claim 1 wherein the inductor is the winding of a solenoid.

5. The current regulator of claim 1 wherein the inductor constitutes the windings of a direct current electric motor.

6. A current regulator comprising:
   (a) a source of direct current power,
   (b) an inductive device for supplying electromagnetic energy to a mechanical device,
   (c) means for applying electric current from the source to the inductive device periodically for fixed periods of time during all charging cycles irrespective of changes in the electric power consumed by the inductive device, or of changes in the voltage of the source of direct current power, in which the current changes from an initial value to a large value determined by the period of time during which the charging cycle takes place,
   (d) means including a free-wheeling diode for discharging electric current from the inductive device in discharge cycles during periods of time intermediate the charging cycles, and
   (e) control means responsive to the electric current which is discharged from the inductive device during each discharge cycle for initiating charging cycles and discharging cycles alternately, with each charging cycle being initiated when the current which is discharged from the inductive device decays to a value that is substantially equal to the initial value of the electric current at the beginning of a charge cycle to maintain the magnitude of the electric current in the inductive device substantially constant with the value varying between the narrow limits of the initial value at the beginning of the charging cycles and said larger value determined by the period of time during which the charging cycles take place.

7. A current regulator comprising:
   (a) a source of direct current electric power,
   (b) an inductive load in which the electric power is to be dissipated by transfer of the electromagnetic energy in the load to a mechanical device,
   (c) switching means for applying electric current from the source to the inductive load periodically for predetermined fixed periods of time during all charging cycles regardless of the duty cycle changes caused by changes in the operating conditions, in which the current changes from an initial value to a larger value determined by the period of time during which the charging cycle takes place,
   (d) means for discharging electric current from the inductive load through a sensing resistor, and
   (e) means responsive to the current that is discharged from the inductive load through the sensing resistor for actuating said switching means to apply electric current from the source to the inductive load to initiate a charging cycle and terminate a discharging cycle when the electric current which is discharged from the inductive load decays to a value that is substantially equal to said initial value of the electric current at the beginning of a charge cycle to maintain the magnitude of the electric current in the inductive load substantially constant with the value varying between the narrow limits of the initial value at the beginning of the charging cycles and a larger value determined by the period of time during which the charging cycles take place.

8. A current regulator comprising:
   (a) a source of direct current power,
   (b) an inductive load,
   (c) control means for applying electric current from the source to the inductive load,
   (d) said control means providing uniform charging cycles of fixed periods of time for all operating conditions for applying energy to the inductive load and discharging cycles during which electric current is discharged from the inductive load and no energy is provided to the inductive load from sources other than the discharge current, with the charging cycles being of less time duration than the duration of the discharging cycles, and
   (e) sensing means responsive to said discharge current for actuating said control means to apply electric current from the source to the inductive load to initiate a charging cycle and terminate a discharging cycle when the electric current which is discharged from the inductive laod decays to a predetermined value to maintain the magnitude of the electric current in the inductive load substantially constant with the value varying between the narrow limits of the initial value at the beginning of the charging cycles and a larger value determined by the period of time during which the charging cycles take place.

9. A current regulator comprising:
(a) a source of direct current power,
(b) an inductor for supplying electromagnetic energy to a mechanical load,
(c) switching means for supplying power from the source of direct current power to the inductor during charging cycles which are of fixed time duration for all operating conditions,
(d) means for discharging electric current from the inductor during discharging cycles when power is not supplied through the switching means to the inductor,
(e) means for providing a reference signal representative of the desired amount of current to be applied to the inductor,
(f) means for providing a control signal that varies in accordance with the decay of the current which is discharged from the inductor during discharge cycles, and
(g) control means responsive to said reference and control signals for actuating the switching means for fixed periods of time to initiate charging cycles when said control signal decays to a predetermined value with respect to the reference signal to maintain the magnitude of the electric current in the inductor substantially constant with the value varying between the narrow limits of the value at the end of the discharging cycles and the value at the end of the charging cycles which is determined by the fixed period of time during which the charging cycles take place.

10. A current regulator comprising:
(a) a source of direct current power,
(b) an electric motor having inductive windings for receiving direct current power,
(c) switching means for supplying power from the source of direct current power to the inductive windings of the electric motor during charging cycles,
(d) means for discharging electric current from said inductive windings during periods of time constituting discharging cycles intermediate the charging cycles,
(e) means for sensing the decay of the electric current from said inductive windings during discharging cycles to provide a first control signal,
(f) means for sensing the speed of rotation of the electric motor to provide a second control signal, and
(g) control means responsive to said first and second control signals for actuating said switching means to apply electric current from the source to said inductive windings for predetermined fixed periods of time for all charging cycles and irrespective of changes in the power consumed by the electric motor when said control signals have a predetermined relationship to regulate the electric current applied to the inductive windings of the electric motor at values varying between the narrow limits of the initial value at the beginning of the charging cycles and the value at the end of the charging cycles.

11. The method of controlling the application of current from a source of direct current electric power to an inductive device for supplying energy to a mechanical device comprising:
(a) applying electric current from the source to the inductive device periodically for fixed periods of time during charging cycles for all operating conditions in which the current changes from an initial value to a larger value determined by the period of time during which the charging cycle takes place,
(b) discharging electric current from the inductive device in discharge cycles during periods of time intermediate the charging cycles, and
(c) terminating each discharge cycle and initiating the charge cycle when the electric current decays during the discharge cycle to a predetermined value with the discharging cycles being of longer time duration than the duration of the charging cycles for all operating conditions to regulate the electric current that is applied to the inductive device at values varying between the narrow limits of the initial value at the beginning of the charging cycles and the larger value at the end of the charging cycles which is determined by the period of time during which charging cycles take place.

12. The method of supplying energy from an inductive device to a mechanical device comprising:
(a) causing the inductive device to apply energy to the mechanical device during charging cycles when the inductive device is energized from a source of direct current power,
(b) causing the inductive device to apply energy to the mechanical device during discharging cycles when the inductive device is discharged by applying current through a discharge path, and
(c) initiating charging cycles and discharging cycles alternately, with each charging cycle having a fixed period of time for all operating conditions which is initiated when the current which is discharged from the inductive device decays to a predetermined value with the discharging cycles being of longer time duration than the duration of the charging cycles for all operating conditions to regulate the electric current that is applied to the inductive device at values varying between the narrow limits of the initial value at the beginning of the charging cycles and the larger value at the end of the charging cycles which is determined by the period of time during which charging cycles take place.

* * * * *